United States Patent
Kerschensteiner et al.

(10) Patent No.: US 12,436,517 B2
(45) Date of Patent: Oct. 7, 2025

(54) APPARATUS FOR CONTROLLING AND/OR MONITORING A TECHNICAL INSTALLATION

(71) Applicant: Primetals Technologies Germany GmbH, Erlangen (DE)

(72) Inventors: Martin Kerschensteiner, Berg (DE); Alexander Thekale, Erlangen (DE)

(73) Assignee: Primetals Technologies Germany GmbH, Erlangen (DE)

( * ) Notice: Subject to any disclaimer, the term of this patent is extended or adjusted under 35 U.S.C. 154(b) by 492 days.

(21) Appl. No.: 17/798,095

(22) PCT Filed: Feb. 2, 2021

(86) PCT No.: PCT/EP2021/052413
§ 371 (c)(1),
(2) Date: Aug. 8, 2022

(87) PCT Pub. No.: WO2021/156241
PCT Pub. Date: Aug. 12, 2021

(65) Prior Publication Data
US 2023/0121747 A1    Apr. 20, 2023

(30) Foreign Application Priority Data
Feb. 6, 2020 (EP) .................................. 20155893

(51) Int. Cl.
*G05B 19/40* (2006.01)
*G05B 15/02* (2006.01)
(Continued)

(52) U.S. Cl.
CPC ..... *G05B 19/409* (2013.01); *G05B 19/40937* (2013.01); *G05B 15/02* (2013.01);
(Continued)

(58) Field of Classification Search
None
See application file for complete search history.

(56) References Cited

U.S. PATENT DOCUMENTS 5,828,575 A * 10/1998 Sakai ................. G05B 19/4097
700/182
8,204,618 B2 * 6/2012 Young, Jr. .............. B23K 31/10
700/166
(Continued)

FOREIGN PATENT DOCUMENTS

| | | |
|---|---|---|
| CN | 103995500 A | 8/2014 |
| CN | 105164595 A | 12/2015 |
| EP | 3293594 A1 | 3/2018 |

OTHER PUBLICATIONS

Chen, W., "Intelligent manufacturing production line data monitoring system for industrial internet of things", Dec. 2019, Computer Communications 151 (2020) 31-41. (Year: 2019).*
(Continued)

*Primary Examiner* — Ziaul Karim
*Assistant Examiner* — Kelvin Booker
(74) *Attorney, Agent, or Firm* — Liang & Hennessey LLP; Brian Hennessey

(57) ABSTRACT

Apparatus and method for controlling and/or monitoring a technical installation for producing and/or processing metal, having an assistant program with at least one interface for connection to application programs, wherein the assistant program receives a request for an item of information relating to the installation from at least one requesting application program via the interface, wherein the assistant program can access a data model that provides a suggestion of which information can be provided by at least one further application program. The assistant program determining, based on the request and on the data model, which application program can provide the requested information,
(Continued)

wherein the assistant program transmits the request to the at least one determined application program which can provide the requested information, wherein the assistant program receives a response from the determined application program, and wherein the assistant program outputs the received response to the requesting application program.

19 Claims, 4 Drawing Sheets

(51) Int. Cl.
  *G05B 19/409* (2006.01)
  *G05B 19/4093* (2006.01)
  *G06F 16/90* (2019.01)
  *G06F 21/62* (2013.01)

(52) U.S. Cl.
  CPC .... *G05B 2219/45234* (2013.01); *G06F 16/90* (2019.01); *G06F 21/62* (2013.01)

(56) References Cited

U.S. PATENT DOCUMENTS

| | | | | |
|---|---|---|---|---|
| 9,110,883 | B2* | 8/2015 | Ghannam | G06F 40/30 |
| 10,021,064 | B2* | 7/2018 | Duca | H04L 12/1895 |
| 10,225,216 | B2* | 3/2019 | Wise | H04L 51/046 |
| 10,394,195 | B2* | 8/2019 | Das | G05B 19/4097 |
| 11,281,196 | B2* | 3/2022 | Ankermann | G05B 19/41865 |
| 2006/0041448 | A1* | 2/2006 | Patterson | G06Q 10/101 |
| | | | | 705/300 |
| 2007/0193012 | A1* | 8/2007 | Bergman | G05B 19/401 |
| | | | | 29/407.04 |
| 2012/0029661 | A1* | 2/2012 | Jones | G05B 19/41865 |
| | | | | 700/17 |
| 2013/0063449 | A1* | 3/2013 | Leitner | G05B 19/4185 |
| | | | | 345/501 |
| 2013/0138250 | A1* | 5/2013 | Mowery | G05D 23/1917 |
| | | | | 700/276 |
| 2014/0121820 | A1* | 5/2014 | Das | G05B 13/04 |
| | | | | 700/182 |
| 2014/0129550 | A1* | 5/2014 | Weatherhead | G06F 16/248 |
| | | | | 707/723 |
| 2014/0336795 | A1* | 11/2014 | Asenjo | G05B 19/4083 |
| | | | | 700/86 |
| 2016/0048123 | A1* | 2/2016 | Froehner | H02J 13/00 |
| | | | | 700/214 |
| 2016/0132538 | A1* | 5/2016 | Bliss | G06F 16/20 |
| | | | | 707/741 |
| 2016/0337289 | A1* | 11/2016 | Duca | H04L 12/1895 |
| 2017/0024422 | A1* | 1/2017 | Maier | G06F 21/6254 |
| 2017/0097621 | A1* | 4/2017 | Ackmann | G05B 15/02 |
| 2017/0346768 | A1 | 11/2017 | Wise et al. | |
| 2018/0231954 | A1 | 8/2018 | Booker | |
| 2019/0030582 | A1* | 1/2019 | Olsson | B23K 26/38 |
| 2020/0004230 | A1* | 1/2020 | Ankermann | G07C 3/146 |

OTHER PUBLICATIONS

Gonzalez et al., "Integration of Sensors, Controllers and Instruments Using a Novel OPC Architecture", Apr. 2017, Sensors 2017, 17, 1512. (Year: 2017).*

Lee et al., "Implementation of Cyber-Physical Production Systems for Quality Prediction and Operation Control in Metal Casting", Mar. 2018, Sensors 2018, 18, 1428. (Year: 2018).*

International Search Report and Written Opinion received in International Application No. PCT/EP2021/052413 dated Apr. 13, 2021, 15 pages.

European Search Report received in European Application No. 20155893.9 dated Jul. 28, 2020, 9 pages.

Office Action in Chinese Application No. 202180012991.3, mailed Jan. 3, 2025, the English translation is a machine translation of the German translation of the Chinese Office Action, 27 pages.

* cited by examiner

APPARATUS FOR CONTROLLING AND/OR MONITORING A TECHNICAL INSTALLATION

CROSS-REFERENCE TO RELATED APPLICATIONS

The present application is a national phase application of PCT Application No. PCT/EP2021/0524313, filed Feb. 2, 2021, entitled "APPARATUS FOR CONTROLLING AND/OR MONITORING A TECHNICAL INSTALLATION", which claims the benefit of European Patent Application No. 20155893.9, filed Feb. 6, 2020, each of which is incorporated by reference in its entirety.

BACKGROUND OF THE INVENTION

1. Field of the Invention

The invention relates to an apparatus for controlling and/or monitoring a technical installation for producing and/or processing metal and to a method for controlling and/or monitoring a technical installation for producing and/or processing metal.

2. Description of the Related Art

EP 3 293 594 A1 discloses an apparatus and a method for controlling and/or monitoring a technical installation for producing and/or processing metal.

US 20170346768 describes a conversation interface system which makes it possible to remotely access information relating to manufacturing processes by interchanging messages in plain language. A cloud-based conversation interface service is connected to an instant messaging application and receives plain text queries from the interface of the instant messaging application which requests information relating to one or more industrial systems. The cloud-based system synchronizes the queries with one or more on-site agent devices for conversation interfaces which are situated in one or more installations. The on-site agent devices translate the queries and apply the translated queries to local sources of manufacturing operating data. The on-site agent devices then generate response messages. The cloud-based system forwards the response messages to the senders of the queries via the instant messaging interface.

US 20180231954 A1 describes a method for receiving a text message from a client device. The text message contains a request for information relating to an industrial process control and automation system. The method also comprises evaluating the text message in order to identify the requested information. The method furthermore comprises transmitting one or more queries for the requested information and receiving the requested information. In addition, the method comprises generating a natural language response containing the requested information and transmitting the natural language response for forwarding to the client device.

SUMMARY OF THE INVENTION

The object of the invention is to provide an improved apparatus and an improved method for controlling and/or monitoring a technical installation for producing and/or processing metal.

The objects of the invention are achieved by the independent patent claims.

Advantageous embodiments of the apparatus and of the method are specified in the dependent claims.

An apparatus for controlling and/or monitoring a technical installation for producing and/or processing metal is proposed. The apparatus has a computing system with at least one interface for connection to at least one further computing system of the installation and/or to at least one sensor apparatus of the installation and/or to at least one man-machine interface and/or to at least one application program (collectively referred to herein as a system element or at least one system element). The computing system is designed to receive a request for an item of information relating to the installation from at least one requesting further computing system and/or from a requesting sensor apparatus of the installation and/or from a requesting man-machine interface and/or from an application program via the interface. The computing system can access a data model via the further computing system and/or the sensor apparatus and/or the man-machine interface and/or a further application program, wherein the data model provides an indication of what information can be accessed by the further computing system and/or the sensor apparatus and/or the man-machine interface and/or the further application program. The computing system is designed to determine, on the basis of the data model, the further computing system and/or the sensor apparatus and/or the man-machine interface and/or the further application program which can provide the information sought.

The computing system is also designed to obtain the requested information from the at least one determined further computing system and/or from the at least one determined sensor apparatus and/or from the at least one determined man-machine interface via the interface. The computing system is also designed to output the obtained information to the requesting further computing system and/or to the requesting sensor apparatus of the installation and/or to the requesting man-machine interface and/or to the requesting application program via the interface. The information obtained can be used, in particular, by one of the computing systems to intervene in the control of a function of the installation and to change the control. For example, the computing system which performs the installation automation can use the information obtained to change the control of the installation.

In particular, the information sought with the request can be found more quickly, more easily and in particular more conveniently with the aid of the data model used since it is first of all determined how the request is best executed, that is to say which source(s) can provide the information sought, in particular with a greater degree of probability. Only after determining the further computing system and/or the sensor apparatus and/or the man-machine interface and/or the further application program which can provide the information sought is the request executed using the determined further computing system and/or the determined sensor apparatus and/or the determined man-machine interface and/or the determined further application program.

This provides a modular apparatus which makes it possible to easily determine information and/or data and/or knowledge of further computing systems of the installation and/or of sensor apparatuses of the installation and/or of man-machine interfaces and/or further application programs. For this purpose, it is not necessary for the information and/or the knowledge to be centrally pooled in a computing system. Connecting the computing system to further computing systems and/or sensor apparatuses of the installation and/or man-machine interfaces makes it possible to obtain information and/or knowledge relating to the entire installation and to forward it to man-machine interfaces and/or to further computing systems and/or to sensor apparatuses and/or application programs and/or to process it further.

In this manner, the installation can be flexibly supplemented with further computing systems, sensor apparatuses and/or man-machine interfaces and/or application programs, or further computing systems, sensor apparatuses and/or man-machine interfaces and/or application programs of the installation can be replaced without it being necessary to delete or change corresponding data or information in a central computing system. Since the further computing systems and/or sensor apparatuses and/or man-machine interfaces and/or further application programs can be accessed for the purpose of determining the data, it is possible to dispense with a data update in a central computing system. In addition, this makes it possible to release or not release information of the further computing systems, sensor apparatuses and/or man-machine interfaces and/or application programs for access depending on predefined boundary conditions. Furthermore, the proposed modular system makes it possible to keep information, data and knowledge of the individual further computing systems, sensor apparatuses and/or man-machine interfaces and/or application programs separate and to forward only certain information, data, control data and/or technical knowledge of the individual further computing systems, sensor apparatuses and/or man-machine interfaces and/or application programs to the computing system. Mixing of the information, data, control data and/or the technical knowledge of the further computing systems, sensor apparatuses and/or man-machine interfaces and/or application programs is therefore avoided. In addition, this modular approach enables a better overview and separation of the functions of the further computing systems, sensor apparatuses and/or man-machine interfaces. This is advantageous, in particular, when searching for a malfunction of the installation since the interchange of data between the further computing systems, sensor apparatuses and/or man-machine interfaces and/or application programs simplifies the process of finding a malfunction of the technical installation.

An item of information may represent, for example, an operating state of at least one installation section of the installation or an operating state of the installation. In addition, an item of information may represent a control value of the installation which is used by the computing system or a further computing system to control the installation. In one embodiment, the information may be based on camera data which optically capture an area of the installation. The information may therefore represent at least one image of a part of the installation or a video sequence showing a part of the installation. The information based on camera data, in particular an image, makes it possible to optically evaluate an operating state of the installation, for example, wherein artificial intelligence can be used when evaluating the camera data. In addition, an image or a video sequence, for example, represents an item of information which can be quickly and easily understood by an operator and is well-suited to assessing the operating state of the installation or to assessing a control variable of the installation. The result of the analysis can also be used by the computing system or a further computing system to change control data for the installation. The operability and control of the technical installation are therefore simplified both for the operator and for the computing systems.

In one embodiment, the computing system is designed to output the obtained information in the form of at least one image or a video sequence, in particular to the man-machine interface. For example, the man-machine interface may have at least one screen or a plurality of screens. In addition, depending on a setting by an operator, an item of desired information can be displayed in the form of an image on one screen or on a plurality of screens. The choice of the information output via the man-machine interface can be stipulated by an operator or automatically by the computing system on the basis of operating parameters or operating states of the installation and/or on the basis of control data of the installation. This achieves an optimized choice of the information output or displayed via the man-machine interface. The information essential to the respective operating state or the respective control data item can therefore be displayed or output using a few screens, in particular using only one screen. This makes it possible to save screens and/or achieve an improved display or output of information. Not only images but also data, operating states, control data etc. can be displayed via the man-machine interface.

In one embodiment, the computing system is designed to determine the information sought with the request from the request. The computing system is also designed to determine which further computing system and/or which sensor apparatus and/or which man-machine interface and/or which further application program can provide the information sought. In this case, the computing system can determine, for example, a probability of the further computing system and/or the sensor apparatus and/or the man-machine interface and/or the further application program being able to provide the information sought. The computing system generally forwards the request to the further computing system and/or the sensor apparatus and/or the man-machine interface and/or the further application program having the highest probability. This reduces the effort for a successful search. For example, the computing system may be designed to determine, on the basis of the data model, probabilities with which the further computing systems and/or the sensor apparatuses and/or the man-machine interfaces and/or the further application programs can determine the information sought with the request. For this purpose, the computing system can use a trained neural network, for example.

In a further embodiment, the computing system is designed to determine the information sought by the request from a request present in the form of text using an NLU (Natural Language Unit) program.

In one embodiment, the data model has, for the further computing systems and/or the sensor apparatuses and/or the man-machine interfaces and/or the further application program, stipulated examples, in particular example sentences, of requests which can be used to successfully search for information in the further computing systems and/or in the sensor apparatuses and/or in the man-machine interfaces and/or further application programs. Instead of an example sentence, the examples may also comprise only a single word and/or a graphic and/or a sound signal and/or a speech signal and/or an image. Depending on the selected embodiment, the request may be designed text in the form of one word or a plurality of words, in particular in the form of a sentence and/or in the form of a graphic and/or in the form of a sound signal and/or in the form of a speech signal and/or in the form of an image.

By comparing the stipulated examples, in particular example sentences, with the request, in particular taking into account the information sought with the request, the computing system determines which further computing systems and/or which sensor apparatuses and/or which man-machine interfaces and/or which further application program can provide the information sought with the request. In addition, the computing system can determine with what probability which further computing system and/or which sensor apparatus and/or which man-machine interface can provide the information sought.

In one embodiment, the computing system receives, in response to a transmitted request for an item of information, a further request for a further item of information relating to the installation from the requested further computing system and/or sensor apparatus and/or man-machine interface and/or further application program. The computing system determines, on the basis of the further request, which further computing system and/or which sensor apparatus and/or which man-machine interface and/or which further application program can respond to the further request. The computing system is designed to obtain the requested further information from the at least one determined further computing system and/or from the at least one determined sensor apparatus and/or from the at least one determined man-machine interface and/or from the at least one further application program via the interface. The computing system outputs the further information obtained to the requesting further computing system and/or to the requesting sensor apparatus of the installation and/or to the requesting man-machine interface and/or to the requesting application program via the interface. An item of information may therefore be determined by a plurality of further computing systems and/or sensor apparatuses and/or man-machine interfaces and/or further application programs together, for example, and may be transmitted to the computing system.

In a further embodiment, the computing system is designed to obtain an item of stipulated information from at least one further computing system and/or a sensor apparatus and/or from a man-machine interface and/or from a further application program via the interface depending on at least one predefined operating state of the installation and/or a predefined control value for the installation. The computing system can output the independently obtained information to a further computing system and/or to a sensor apparatus and/or to a man-machine interface and/or to the application program via the interface.

For example, desired information, data and/or images can be automatically determined and output to further computing systems and/or sensor apparatuses and/or man-machine interfaces and/or application programs depending on stipulated situations, for example predefined faults of the installation. The information determined and provided is therefore automatically adapted for stipulated situations. Automatically adapting the information achieves improved control and/or monitoring of the installation with the aid of the further computing systems and/or with the aid of an operator via the man-machine interface and/or with the aid of the control apparatuses and/or with the aid of the application programs.

Depending on the selected embodiment, an operator, for example, can stipulate in which operating states and/or for which predefined control values which stipulated information is obtained from at least one further computing system and/or at least one sensor apparatus and/or a man-machine interface and/or an application program via the first interface and to which further computing system and/or which sensor apparatus and/or which man-machine interface and/or which application program the obtained information is transmitted. The acquisition of information and the flow of information can therefore be configured by an operator, for example. The man-machine interfaces have appropriate input means for this purpose. This makes it possible to individually adapt the monitoring and control of the installation and, in particular, the man-machine interface.

In a further embodiment, the computing system is designed to be able to convert a request in the form of an acoustic request, in particular in the form of a speech request, into text and to further process the text as a request. Converting the acoustic request into the text, which can represent a program instruction, makes it possible to search for and obtain the information desired in the acoustic request via the interfaces. This enables simplified control and monitoring of the apparatus. Furthermore, the computing system is designed to output the information obtained via the first interface to a further computing system and/or a sensor apparatus and/or an application program via the first interface and/or to the man-machine interface via the second interface. For example, the man-machine interface has a microphone for a speech input. In addition, the computing system may have a data memory in which stored acoustic speech commands are assigned to stipulated program instructions. This simplifies the conversion of the acoustic request into program instructions of the computing systems. In this case, the acoustic speech signal, that is to say the speech, can first of all be converted into text and the text can then be converted into a program instruction for a program, in particular for a program of a computing system or of a further computing system. The program may be in the form of an application program or an assistant program, for example.

In a further embodiment, the computing system is designed to capture and store an operating state of the installation and/or a production quality of the installation and/or a maintenance state of the installation at least at stipulated times, in particular continuously. In a further embodiment, the computing system is designed to further process operating states of the installation and/or production qualities of the installation and/or maintenance states of the installation, which were captured at different times, or to compare them with one another. In addition, depending on the selected embodiment, the captured operating state of the installation and/or the captured production quality of the installation and/or the captured maintenance state of the installation can be output to a further computing system and/or to a sensor apparatus and/or to an application program via the first interface and/or to the man-machine interface via the second interface. The further computing systems and/or sensor apparatuses and/or a man-machine interface and therefore an operator can therefore be automatically informed of important parameters of the installation.

In a further embodiment, the computing system is designed to analyze the captured operating states and/or production qualities and/or maintenance states. For example, operating states of the installation which were captured at different times can be compared with one another. For example, production qualities of the installation which were captured at different times can be compared with one another. For example, maintenance states of the installation which were captured at different times can be compared with one another. In this case, databases, stored evaluation methods, artificial intelligence etc. can be used, for example. Additional information relating to the installation and/or recommended actions can be determined with the aid of the analysis and can be output to the further computing systems and/or the sensor apparatuses and/or the man-machine interface and/or application programs. Furthermore, the analyzed data may also be stored in a data memory of a computing system. This makes it possible to improve a subsequent analysis of the function of the installation, in particular fault finding.

In a further embodiment, further computing systems for installation sections of the installation can be connected to the computing system via the interface, wherein the further computing systems carry out installation control and/or condition monitoring and/or a maintenance system for at least one installation section of the installation and/or have a spare parts catalog for at least one installation section of the installation, wherein each installation section has a data memory containing documentation relating to the installation section. The computing system may be designed to access the documentation relating to the installation sections of the installation via the interface, to search for information in the documentation and to output it to a further computing system and/or to a sensor device and/or to a man-machine interface and/or to an application program via the interface. In this manner, the computing system can search for information in the documentation relating to the installation section and can transfer it to a further computing system and/or a sensor apparatus and/or an application program via the first interface and/or to a man-machine interface via the second interface. In this manner, it is not necessary for the information relating to the installation sections to be centrally collected. If necessary, the individual information relating to the installation sections, in particular the documentation relating to the installation sections which are connected to the installation, can be accessed.

In addition, the computing system may be designed to determine at least one item of information relating to the installation with the aid of a maintenance/operating program, to output instructions via the interface, to document steps which have been carried out and/or to intervene in control of the installation. In this case, the maintenance/operating program can resort to stored knowledge and/or learned knowledge. In particular, the maintenance/operating program may use artificial intelligence and, in particular, may take into account knowledge learned with the aid of the artificial intelligence when documenting or controlling the installation. For example, the maintenance/operating program may carry out evaluations using data analysis methods, for example deep learning, machine learning, support vector machines.

In a further embodiment, the computing system is designed to communicate with at least one further computing system and/or sensor apparatuses and/or man-machine interfaces, that is to say to interchange data and information, via an interface with the aid of standardized messages and/or standardized communication protocols.

In one embodiment, the data model has a first data model which is provided for a plurality of further computing systems and/or sensor apparatuses and/or man-machine interfaces and/or further application programs. The computing unit is designed to determine in a first step, on the basis of the request and with the aid of the first data model, the at least one further computing system and/or the at least one sensor apparatus and/or the at least one man-machine interface and/or the at least one application program which can provide the information sought with the request.

The data model has a second data model for in each case a further computing system and/or in each case a sensor apparatus and/or in each case a man-machine interface and/or in each case a further application program. A separate second data model can be provided for each further computing system and/or each sensor apparatus and/or each man machine interface and/or each further application program.

The second data model has, for a further computing system or a sensor apparatus or a man-machine interface or a further application program, stipulated examples, in particular example sentences, of requests which can be used to successfully search for information in the further computing system or in the sensor apparatus or in the man-machine interface with the aid of functions of application programs. Instead of an example sentence, the examples of the second data models may also comprise only a single word and/or a graphic and/or a sound signal and/or a speech signal and/or an image.

The computing unit determines, on the basis of the second data models of the further computing systems and/or sensor apparatuses and/or man-machine interfaces and/or application programs determined in the first step, which application program of the further computing system and/or sensor apparatus and/or man-machine interface determined in the first step and/or which function of the determined further application program can be used to determine the information sought.

After determining the application program or the function of the application program which can determine the information sought, the request is transferred to the determined function or the determined application program. The computing system then receives the information from the determined function or from the determined application program.

In a further embodiment, the data model is designed with the aid of artificial intelligence, in particular as a trained neural network. The artificial intelligence is designed to determine the further computing system and/or the sensor apparatus and/or the man-machine interface and/or the application program which can provide the information sought with the request. The neural network may have been trained with the aid of a supervised learning method with predefined examples in order to determine, on the basis of a request, the further computing system and/or the sensor apparatus and/or the man-machine interface and/or the application program which can provide the information sought with the request. The examples may be similar or identical to the requests.

In a further embodiment, the first data model is designed with the aid of artificial intelligence, in particular as a trained neural network, wherein the artificial intelligence is designed to determine the further computing system and/or the sensor apparatus and/or the man-machine interface and/ or the application program which can provide the information sought. The neural network may have been trained with the aid of a supervised learning method with examples. The examples may be similar or identical to the requests.

In a further embodiment, the second data model is designed with the aid of artificial intelligence, in particular as a trained neural network, wherein the artificial intelligence is designed to determine the application program of the further computing system and/or of the sensor apparatus and/or of the man-machine interface and/or the function of the application program which can provide the information sought. The neural network may have been trained with the aid of a supervised learning method with examples. The examples may be similar or identical to the requests.

In one embodiment, the computing system may access a data memory or has a data memory. The data memory stores, as a data model, an item of information relating to which further computing systems and/or which sensor apparatuses and/or which man-machine interface is/are connected via the interface and which information the further computing systems and/or sensor apparatuses and/or man-machine interface and/or further application programs may have or may access. In this manner, in the event of a request, the computing system can specifically search for the information desired in the request in at least one further computing system and/or a sensor apparatus and/or a man-machine interface and/or an application program. The computing systems and/or sensor apparatuses and/or man-machine interfaces and/or further application programs in which a search is carried out may change, in particular during the runtime of a program which carries out the search. In this manner, the search for the information desired in the request is simplified and can be carried out more quickly.

Depending on the selected embodiment, the method of operation of the computing system and/or of the further computing systems may be implemented in the form of an electronic circuit and/or in the form of computing programs.

In one embodiment, the computing system has an assistant program. In addition, at least one further computing system and/or a sensor apparatus and/or a man-machine interface has/have at least two application programs. The assistant program is designed to receive a request for an item of information via the interface. The assistant program is also designed, on the basis of the information sought by the request, to determine the application program which can provide the information sought. The assistant program is furthermore designed to forward the request to the application program which can provide the information. The assistant program is also designed to receive the information sought from the application programs. The assistant program can output the information received from the application programs to the requesting further computing system and/or to the requesting sensor apparatus and/or to the requesting man-machine interface via the interface.

The application programs are designed to search for the desired information on the basis of the transferred request. If the application program finds the desired information, the information found is returned to the assistant program. The assistant program is designed to output the information received from the application programs via the first and/or the second interface. The received information is output to the further computing system, to the man-machine interface and/or to the sensor apparatus depending on whether the further computing system, the sensor apparatus and/or the man-machine interface has/have transmitted the request to the assistant program. The assistant program may be designed to implement a free field search, a speech input and/or a machine-to-machine interface. The assistant program may also be programmed in a web-based manner In one embodiment, the two application programs are designed to search for different information and/or information with a different representation and/or information from different installation sections of the installation and/or information from different databases of the installation. For example, the application programs can be used to search for specific operating data, specific control data, specific quality data, predefined error reports, data from different installation parts of the installation and data from different databases of the installation. In addition, the information may differ in terms of the type of data, for example data values, images, analyzed data, learned data, aggregated data etc. Furthermore, the information may be available in the form of documents, drawings, images, abbreviations etc.

In a further embodiment, the computing system is designed, in particular with the aid of the assistant program, to output images, documents, web addresses of information and/or data via the first and/or the second interface. For example, information in the form of images, in the form of documents or in the form of web addresses of the information may therefore be output via the first and/or the second interface.

A computer-implemented method for controlling and/or monitoring a technical installation for producing and/or processing metal is provided, which method uses an assistant program with at least one interface for connection to application programs. The assistant program receives a request for an item of information relating to the installation from at least one requesting application program via the interface. The assistant program can access a data model, wherein the data model provides an indication of which information can be provided by at least one further application program. The assistant program determines, on the basis of the request and on the basis of the data model, which application program can provide the requested information. The assistant program then transmits the request to the at least one determined application program which can provide the information. The assistant program receives a response from the determined application program and outputs the received response to the requesting application program. The information obtained may be used, in particular by the assistant program and/or one of the application programs, to intervene in the control of a function of the installation and to change the control. For example, the installation automation can use the information obtained to change the control of the installation.

In one embodiment, the data model has a first data model which is provided for a plurality of further application programs. The data model also has second data models for at least one further application program, in particular for each of the further application programs. The assistant program first of all determines, on the basis of the request and with the aid of the first data model, the further application program(s) which can provide the desired information. The assistant program then determines, on the basis of the at least one second data model of the at least one further application program determined in the first step, a function of the determined further application program which can provide the information sought. The assistant program then transfers the request to the determined function of the determined further application program. The assistant program then receives the information sought with the request from the determined function as a response.

In one embodiment, the data model is designed with the aid of artificial intelligence. The artificial intelligence may be in the form of a trained neural network. The artificial intelligence is designed to determine the further application program(s) and/or the function of the further application programs which can provide the information sought. The neural network may have been trained with the aid of a supervised learning method with examples. The examples may be similar or identical to the requests.

In one embodiment, the first and/or the second data model is/are designed with the aid of artificial intelligence. The artificial intelligence of the first and/or the second data model may be in the form of a trained neural network. The artificial intelligence is designed to determine the further application program(s) and/or the function of the further application programs which can provide the information sought. The neural network may have been trained with the aid of a supervised learning method with examples. The examples may be similar or identical to the requests.

In one embodiment, the assistant program determines an item of information sought with the request from the request. The assistant program then determines, with the aid of the information sought and the data model, which application program can provide the information sought. In this case, the assistant program can check, in particular, with what probability which application program can provide the information sought. The assistant program generally forwards the request to the application programs which have the highest probabilities. This reduces the effort for a successful search.

In one embodiment, the assistant program uses a recognition program, in particular an NLU program, to determine, from a request available as text, the information sought by the request. The recognition program may be designed with the aid of artificial intelligence, in particular may be in the form of a trained neural network. The assistant program can access a data model for the application programs. The data model contains an indication of which information can be accessed by the application programs which can be used by the assistant program to set up communication. The assistant program determines which of the application programs can provide the information sought, in particular by comparing the request, in particular the information sought, with the examples of the data model. A trained neural network, which determines the application programs which are best suited to executing the request on the basis of the request, can also be used as a data model for this purpose. In this case, the assistant program can determine, for example, a probability of an application program being able to execute the request and being able to determine an item of desired information, for example.

In one embodiment, the data model has in each case, for at least some of the application programs, a stipulated example of a search for information using the application program. The stipulated example may be, for example, in the form of an example word or at least one example sentence, in particular in the form of a plurality of example sentences. The stipulated examples represent search requests which can be used to search for information with the aid of the application programs. For example, an NLU program can check, by comparing the stipulated example sentences with the information sought, which application program can provide the information sought. In this case, the NLU program can also determine probabilities for the individual application programs of an application program being able to execute the request and being able to provide an item of sought information, for example.

In one embodiment, the assistant program receives, in response to a request for an item of information, a further request for a further item of information relating to the installation from the requested application program. The assistant program determines, on the basis of the further request, which application program can respond to the further request. The assistant program then obtains the further information from the at least one determined application program, wherein the assistant program outputs the further information obtained to the requested application program. It is therefore possible for an application program which was asked for an item of information to itself request a further item of information. An item of information can therefore be determined by a plurality of application programs together, for example, and can be transmitted to the assistant program. An application program can therefore respond to a request even if the application program can respond to only a part of the request and obtains further information from other response programs in order to respond to the request.

In one embodiment, the assistant program obtains an item of stipulated information from at least one application program depending on at least one predefined operating state of the installation and/or depending on at least one predefined control value for the installation. The assistant program then outputs the independently obtained information to a further application program or stores the independently obtained information in a data memory.

In one embodiment, the information is based on an operating state of the installation or a control variable of the installation. For example, the information sought may be based on camera data or video data and may represent an image or a video sequence, in particular.

In one embodiment, the assistant program forwards the obtained information to the requesting application program. In addition, instead of the information itself, the assistant program may forward a web address or a memory address to the requesting application program. In this case, the application program can itself fetch, provide, output and/or store the information sought by accessing the web address or the memory address.

In one embodiment, the assistant program converts a request in the form of an acoustic request, in particular in the form of a speech request, into a program request and searches for the information desired in the acoustic request using an application program, wherein the assistant program outputs the information found to an application program.

In one embodiment, the assistant program captures an operating state of the installation and/or a production quality of the installation and/or a maintenance state of the installation at least at stipulated times, in particular continuously, and stores it/them in a data memory and/or forwards it/them to application programs.

In one embodiment, the assistant program analyzes the captured operating states and/or production qualities and/or maintenance states with the aid of technological knowledge and determines additional information and/or recommended actions and/or control values for the installation and stores it/them and/or outputs it/them to application programs, in particular for monitoring and/or controlling the installation.

In one embodiment, a plurality of application programs of installation sections of the installation are connected to the assistant program. The application programs of the installation sections may comprise, for example, installation control and/or condition monitoring of the installation and/or a maintenance system of the installation and/or a spare parts catalog of at least one installation section of the installation. In addition, an application program of an installation section may have or access documentation relating to the installation section. The assistant program may access, for example, the documentation relating to the installation section, may search for information in the documentation and may forward the information from the documentation to an application program.

In one embodiment, the assistant program determines information relating to the installation with the aid of a maintenance/operating program and forwards the information or instructions and/or control values for the installation which are determined on the basis of the information to an application program. Furthermore, the assistant program may document the steps which have been carried out. In addition, on the basis of the information and/or instructions and/or control values, the assistant program can intervene in control of a function of the installation and can change the control of the function of the installation. In addition, the application program can itself determine control values for the installation on the basis of the information and/or instructions. Furthermore, the application program can use the control values to intervene in control of a function of the installation and can change the control of the function of the installation.

In this case, the assistant program and/or the application program may take into account stored knowledge and/or learned stored knowledge, in particular stored knowledge learned with artificial intelligence, and may carry out evaluations using data analysis methods, in particular. The application program may be a maintenance/operating program, for example.

In one embodiment, the assistant program communicates with the application programs with the aid of standardized messages and/or standardized communication protocols.

In one embodiment, the assistant program accesses a data memory, wherein the data memory stores an item of information relating to which application programs are connected via the first interface, and wherein the data memory stores, in particular, an item of information relating to which data and/or information the application programs have.

In one embodiment, the assistant program communicates at least with two application programs, wherein the assistant program receives a request for an item of information from a requesting application program. The assistant program forwards the request to one of the two application programs depending on the information sought. The application program to which the request has been forwarded uses the transferred request as a basis for searching for the desired information and returns the information found to the assistant program as a response. The assistant program outputs the information received from the application program to the requesting application program.

In one embodiment, the two application programs are designed to search for different information and/or information with a different representation and/or information from different installation sections of the installation and/or information from different databases of the installation.

In one embodiment, the assistant program forwards the information which has been found and may be images, documents or data, for example, to the requesting application program. In addition, instead of the information itself, the assistant program may forward a web address or a memory location, at which the information can be found, to the requesting application program.

A request may comprise the performance of predefined control of the installation, a change in the control of the installation and/or provision of an item of information, for example for an operator or for an application program that monitors and/or controls the installation.

The application programs may be executed by one or more of the further computing systems and/or sensor apparatuses and/or man-machine interfaces.

BRIEF DESCRIPTION OF THE DRAWINGS

The above-described properties, features and advantages of the invention and the manner in which they are achieved become clearer and more distinctly comprehensible in connection with the following description of the exemplary embodiments which are explained in more detail in conjunction with the drawings, in which, in a schematic illustration.

DETAILED DESCRIPTION

Figure 1:
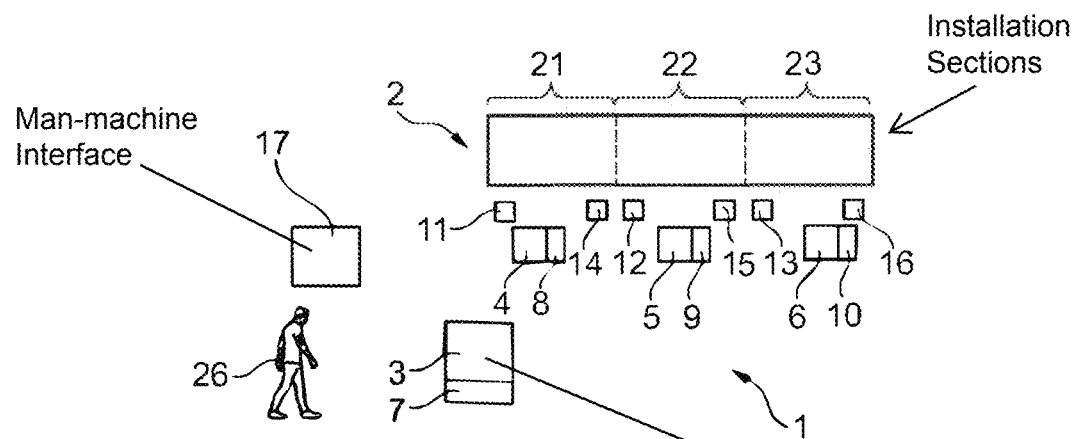
FIG. 1 shows a structural design of an installation for producing and/or processing metal.

FIG. 1 shows a schematic illustration of an installation 2 having an apparatus 1 for controlling and/or monitoring the technical installation 2. The installation 2 is designed to produce and/or further process metal. For example, the installation 2 may be designed to produce and/or process steel. The installation 2 may have a blast furnace, a converter, an electric arc furnace, secondary metallurgy assemblies, a continuous casting installation, a rolling mill and/or a strip processing line. For example, the installation may be in the form of an installation for producing iron, in particular for producing steel, and may have, for example, a blast furnace, a Finex, Corex or Midrex, rotary kiln or rotary hearth direct reduction installation with or without a submerged arc furnace.

Furthermore, the installation 2 may have downstream devices in which steel is produced from pig iron. Examples of such installations are an arc furnace, a converter and installations in which pan processes take place, for example a vacuum treatment installation. In addition, the installation may have a device which is downstream of the production of steel and in which primary shaping of the metal and reshaping of the primary shaped metal are carried out. Examples of such installations are a continuous casting installation and rolling mills. The rolling mills may be, for example, a rolling mill for rolling a flat rolling material, for example a roughing train, a finishing train, a Steckel rolling mill and others. Furthermore, the rolling mills may be a rolling mill for rolling any desired cross sections, for example a billet cross section. The rolling mill may alternatively be a rolling mill for the hot rolling of metal, a rolling mill for the cold rolling of metal or a combined rolling mill in which the metal is first of all subjected to hot rolling and then to cold rolling. In addition, the installation may also have a cooling section, if appropriate in combination with a rolling mill. In addition, the installation may also have other installations which are arranged upstream or downstream of a rolling mill, for example an annealer or a pickier.

The installation 2 may be subdivided into a plurality of installation sections 21, 22, 23. The installation sections 21, 22, 23 undertake subtasks of producing and/or processing metal.

An apparatus 1 for controlling and/or monitoring the installation 2 is also provided. The apparatus 1 may have a superordinate system such as a production planning unit and/or a logistics system or a control system, which are implemented, for example, with the aid of at least one or more of the computing systems illustrated.

The apparatus 1 may have a first computing system 3 with a first data memory 7, a second computing system 4 with a second data memory 8, a third computing system 5 with a third data memory 9 and a fourth computing system 6 with a fourth data memory 10. Depending on the selected embodiment, more or fewer computing systems may also be provided.

The first computing system 3 may be provided as a central computing system which is connected to the further computing systems 4, 5, 6. In addition, each computing system 3, 4, 5, 6 can be connected to a first, second and third sensor apparatus 11, 12, 13. The sensor apparatuses may be in the form of smart sensors. A smart sensor is a sensor which, in addition to actually capturing measurement variables, also combines signal conditioning and signal processing in one housing. Such complex sensors usually comprise, inter alia, a microprocessor or a microcontroller, if necessary also additionally with DSP functionality and the like, for example complex logic units such as FPGAs etc., and provide standardized interfaces for communicating with superordinate systems, for example field bus systems, sensor networks, IO link etc.

The sensor apparatuses 11, 12, 13 capture operating states and/or operating parameters of the installation 2 and relay them to the corresponding computing system 4, 5, 6. Depending on the selected embodiment, the sensor apparatuses 11, 12, 13 may also be directly connected to the first computing system 3. In addition, the sensor apparatuses 11, 12, 13 may have their own computing systems with computing units and interfaces and may be in the form of smart sensors and may be connected to the first computing system 3. In addition, the installation 2 may have actuators 14, 15, 16 which are controlled by at least one computing system 4, 5, 6 using a control value. The actuators 14, 15, 16 are used to change operating states of the installation 2.

Furthermore, at least one man-machine interface 17 is provided, which interface is connected to the first computing system 3 and is designed to input requests, to receive requests and to output information. The man-machine interface 17 may have at least one or more screens. In addition, the man-machine interface 17 may have input means in the form of a keyboard, a gesture controller or a microphone and a speech controller. An operator 26 can ask for information relating to the installation 2 via the man-machine interface 17, wherein the information relating to the installation 2 is output via the man-machine interface 17. In addition, the man-machine interface 17 may receive requests from the computing systems and may respond to the requests. For this purpose, the man-machine interface 17 may have a computing unit and a data memory. Application programs for operating the man-machine interface may run on the computing unit.

Each of the computing systems 3, 4, 5, 6 has at least one computing unit, a first interface and at least one program, in particular an assistant program and/or an application program, which can be used to process, receive and/or output data and/or sensor information and/or control values. A computing system 4, 5, 6 may have process automation for the installation 2 in the form of electrical circuits and/or in the form of an application program. The process automation may comprise a plurality of levels. A level 0 is formed, for example, by the sensors and the actuators. A level 1 forms basic automation for controlling and/or regulating the installation, which implements control circuits, in particular. A level 2 contains technological automation which comprises process models and determines the target values for the control circuits. In addition, it is possible to provide further levels which may comprise, for example, production planning, maintenance, maintenance planning and/or quality assessment.

Although operation of the installation 2 is generally highly automated with the aid of the computing systems 4, 5, 6, it is not always automated completely and in a closed manner In particular, it is possible for an operator 26 to intervene in the automatic control of the installation in particular situations, for example faults. The operator 26 acts on at least one computing system 3, 4, 5, 6, for example via the man-machine interface 17, for example with the aim of maintaining safe operation of the installation and/or avoiding, as far as possible, negative effects on the operation of the installation as such, the productivity of the installation and/or the product quality.

Figure 2:
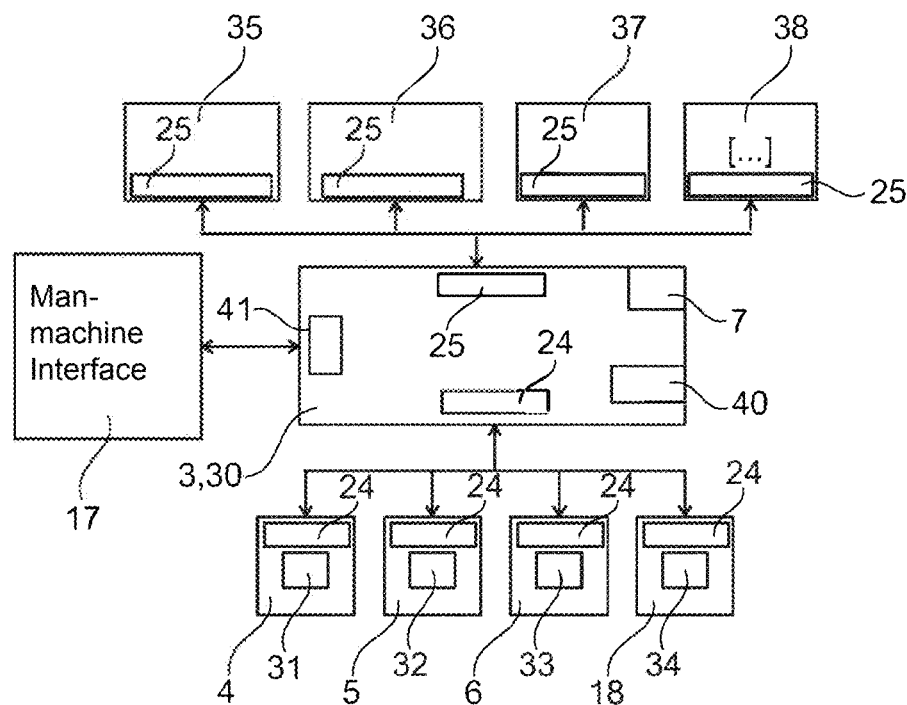
FIG. 2 shows a structural design of an apparatus having a computing system, further computing systems, sensor apparatuses and a man-machine interface for controlling and/or monitoring a technical installation.

FIG. 2 shows a schematic illustration of a basic concept for the collaboration of the first computing system 3 with the second, third and fourth and a fifth computing system 4, 5, 6, 18. A first, second, third, fourth and fifth application program 31, 32, 33, 34, 35 can respectively run in the second, third, fourth and fifth computing system 4, 5, 6, 18. For example, the second computing system 4 and the third computing system 5 may carry out process automation of the installation 2. In this case, the second computing system 4 can carry out level 1 and the third computing system 5 can carry out level 2 of the process automation. The fourth computing system 6 may monitor the condition of the installation 2, for example. The fifth computing system 18 may carry out process optimization across the entire process, in which case expert knowledge is stored in the form of expert rules in a data memory of the fifth computing system 18 and is taken into account by the fifth computing system 18. Furthermore, a computing system may execute an application program for a quality assurance system. The quality assurance system may be provided in order to continuously monitor and control the quality in all production processes along the entire production chain.

In a further embodiment, one of the computing systems mentioned may execute an application program for a maintenance method. The maintenance method involves taking into account expert knowledge which is stored, for example, in a data memory of the computing system in order to convert unproductive and time-consuming maintenance routines into an intelligent asset management program which can be used to strategically and dynamically make maintenance decisions. The maintenance program may be designed to retrieve historical data for a particular installation component. The data may comprise information relating to how often repair work was required, when components of the installation were last replaced, which improvements have been made etc. Maintenance can be planned more smoothly, in a more predictable and better manner by virtue of a data analysis.

Data are communicated between the first computing system 3 and the second, third, fourth and fifth computing system 4, 5, 6, 18 via a first interface 24, for example. The first interface 24 may be, for example, in the form of a stipulated communication protocol with stipulated messages. For example, the first interface 24 may be in the form of a message broker which is used to transmit messages between the first and/or second interfaces of the computing systems and/or sensor apparatuses. The message broker may implement one of a plurality of possible communication protocols for the purpose of interchanging messages.

The first computing system 3 may have an assistant program 30 which implements data communication with the second, third, fourth and fifth computing system 4, 5, 6, 18, the at least one man-machine interface 17 and/or the sensor apparatuses. The man-machine interface 17 is connected to the first computing system 3 or the assistant program 30 via a further interface 41, for example a programming interface. The sensor apparatuses may be connected to the first computing system, for example via the second, third and fourth computing system, or may be directly connected to the first computing system.

The first computing system 3 also has a second interface 25, via which further application programs 35, 36, 37, 38 are connected to the assistant program 30. The further application programs may run on the first computing system 3 and/or on one of the further computing systems 4, 5, 6, 18, and/or the further application programs may be in the form of a cloud solution and may be connected to the computing system 3 via a network connection, for example an Internet connection. Each of the further application programs 35, 36, 37, 38 may perform one or more functions which can be used to determine stipulated information relating to the installation 2. Like the first interface 24, the second interface 25 may be in the form of a message broker. Depending on the selected embodiment, it is also possible to use a different type of data communication, in particular with stipulated messages and/or a stipulated communication protocol. The further assistant programs 35, 36, 37, 38 may be provided, for example, for the purpose of finding and/or storing information relating to the installation 2.

For example, the fifth application program 35 may manage an image database relating to the installation 2. The image database may store current images and/or video sequences, and/or images and/or video sequences recorded in the past, of particular sections of the installation. The sixth application program 36 may have a database relating to abbreviations of components, functions, data, operating states, control data etc. of the installation. The seventh application program 37 may be, for example, in the form of a document search program which can be used to search for documents relating to components, parts and/or installation sections of the installation 2. The eighth application program 38 may be in the form of a program for documenting information relating to operating states and/or control data and/or operating parameters of the installation 2.

The first computing system 3 also has, for example, a speech recognition program 40 which can be used to analyze and evaluate spoken language and to determine and/or further process information of the spoken language. For example, a Rasa NLU program can be used as a speech recognition program. Instead of the first and second interfaces, it is also possible to provide only one interface in order to connect the computing system to the further computing systems, the sensor apparatuses and/or the man-machine interfaces and to interchange data.

The assistant program 30 implements a digital assistance system which can access applications in the form of the further application programs 35, 36, 37, 38 or application programs of the further computing systems and/or application programs of the sensor apparatuses. In addition, the digital assistance system in the form of the assistant program 30 can access data and information of the computing systems 4, 5, 6, 18, of the sensor apparatuses and/or of the man-machine interfaces and can interchange requests and responses with the computing systems, the sensor apparatuses and/or the man-machine interfaces.

It is therefore possible for an operator 26 to easily access all data of the computing systems and of the sensor apparatuses with the aid of the further application programs 35, 36, 37, 38 and the assistant program 30 via the man-machine interface 17. Furthermore, the second, third, fourth and fifth computing system 4, 5, 6, 18 and the sensor apparatuses may access data of the other computing systems, of the other sensor apparatuses and of the man-machine interfaces with the aid of the assistant program, wherein the further application programs 35, 36, 37, 38 can also be used.

Figure 3:
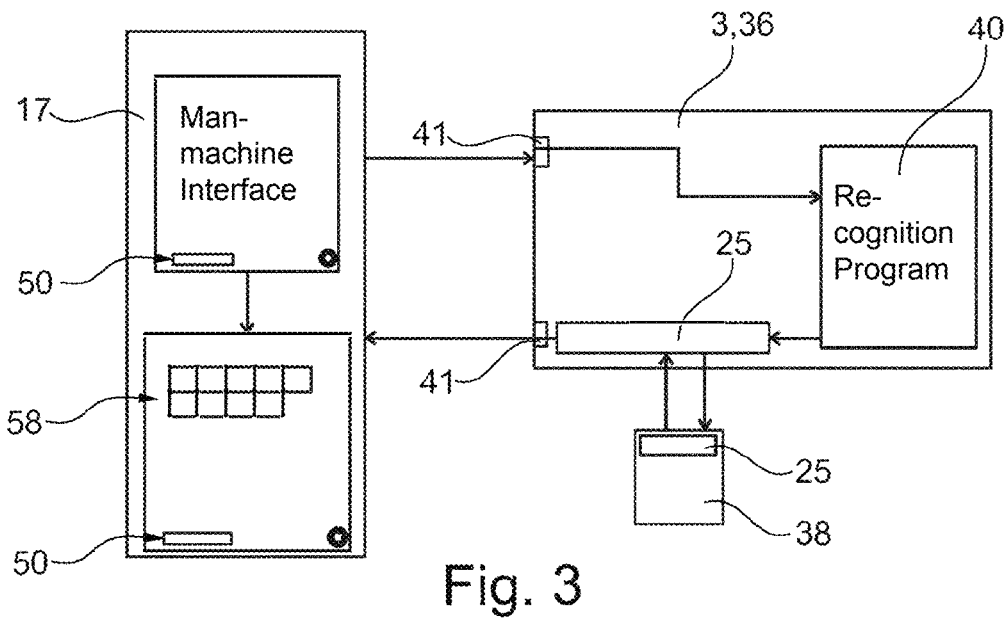
FIG. 3 shows an illustration of a computer-implemented method for processing a request by means of the computing system.

FIG. 3 shows a schematic illustration of a computer-implemented method which can be used by an operator to obtain information relating to the installation 2 with the aid of the first computing system 3 via the man-machine interface 17. For this purpose, the operator inputs a request to an input field 50 of a screen of the man-machine interface 17, for example via a keyboard. The request is: "Show me some examples". Depending on the selected embodiment, the request may also be input via a microphone in the form of a spoken language. The request is displayed in an input field 50 of the screen of the man-machine interface 17.

In a subsequent step, the request (search request message) is transferred to the programming interface 41 of the first computing system 3. If the request is in the form of written text, the request is transferred to a recognition program 40. In the recognition program 40, a function (intent) and, if present, a content (entity) for the function, which specifies the function more accurately, are filtered out from the text. The function may be, for example, a search function for information relating to the installation, a control function for controlling the installation, a monitoring function for monitoring the installation. The content may indicate, for example, which information relating to the installation is sought. In addition, the content can indicate which function of the installation is intended to be controlled and, in particular, how the function of the installation is intended to be controlled. In addition, the content can indicate which part of the installation is intended to be monitored with respect to which parameter. For this purpose, the recognition program has a data model of predefined texts assigned to predefined functions. The input text is compared with the stored predefined texts. The comparison results in at least one predefined text being identified as matching the input text. In addition, the function assigned to the matching predefined text is determined. The data model for determining a function and a content may have been previously determined by experiments.

The data model may be designed with the aid of artificial intelligence, in particular as a trained neural network. The artificial intelligence is trained and designed to determine a function and/or a content of the function. In addition, the artificial intelligence may be designed to determine the further computing system and/or the sensor apparatus and/or the man-machine interface and/or the application program which can provide the function sought and the content sought, that is to say the information sought with the request.

In addition, the artificial intelligence may be designed to determine the function of an application program and, if present, a content which is intended to be determined using the function, so that the information sought with the request can be provided. The artificial intelligence may be implemented in the form of hardware and/or software. For example, a Rasa NLU program can be used as a recognition program.

If the request is in the form of a spoken language, the request is transferred to a recognition program 40 which can be used to process speech inputs. In the recognition program 40, a function (intent) and, if present, a content (entity), which specifies the function more accurately, are filtered out from the spoken request. As explained above, the recognition program may also be in the form of artificial intelligence, in particular in the form of a trained neural network. The function may be, for example, a search function, a control function, or a monitoring function. The content may indicate, for example, which information relating to the installation is sought. In addition, the content may indicate which function of the installation is intended to be controlled and how. In addition, the content may indicate which part of the installation is intended to be monitored with respect to which parameter. For this purpose, the speech recognition has a data model of predefined speech inputs assigned to predefined functions. The speech input which has been input is compared with the stored predefined speech inputs. The comparison results in at least one predefined speech input being identified as matching the speech input which has been input. In addition, the function assigned to the matching predefined speech input is determined. The data model for the speech input for determining a function and a content may have been previously determined by experiments. For example, a Rasa NLU program may be used as speech recognition.

In addition, the recognition program may be designed to indicate, in addition to the determined function (intent), a probability of the determined application program and/or the determined function being able to be correctly assigned to the request. When using artificial intelligence, such as in the Rasa NLU program, the determined result will additionally indicate a probability of the assignment being correct. A plurality of further application programs and/or functions with different probabilities can therefore be determined for a request. As the method proceeds, the application program (s) and/or functions with the higher probability is/are executed first in order to obtain the information sought as quickly as possible and with as little effort as possible. A plurality of application programs and/or functions can therefore be executed in order to obtain the information sought.

At a subsequent program point, the determined function (intent) and, if present, at least one determined content (entity) of the function are transferred to the first computing system 3. The content may also represent, for example, at least one parameter of the function. For example, the parameter may represent a control value of a control program of the installation or a parameter of an item of desired information. The determined content may be a parameter of the determined function, for example. In the present example, "Search for examples" is transmitted to the first computing system 3 as the determined function. The first computing system 3 compares the identified function "Search for examples" with a predefined data model. The data model comprises assignments between predefined functions and predefined application programs. In this example, the first computing system 3 determines, on the basis of the predefined data model, the eighth application program 38 which is able to search for examples. The first computing system 3 forwards the request "Search for examples" to the eighth application program 38 via the second interface 25. The second interface 25 uses a message broker, for example, to communicate with the eighth application program 38.

The message broker of the second interface transmits the request to the eighth application program 38 as a TApp request message. In accordance with the received request, the eighth application program 38 searches for corresponding examples in corresponding databases which can be accessed by the eighth application program. The eighth application program 38 returns examples which have been found, for example in the form of data or images, to the second interface 25 of the computing system 3 as a response via the message broker 25. In addition or instead of the examples themselves which have been found, memory addresses, for example Internet addresses, for the examples which have been found can also be transmitted to the computing system. The examples which have been found and/or the memory addresses are transmitted back to the man-machine interface 17 in the form of a response via the programming interface 41 with the aid of the message broker. The man-machine interface 17 displays the transmitted examples, in particular the images of the installation and/or the memory addresses and/or the memory addresses, in a display window 58. Depending on the selected embodiment, the man-machine interface 17 may itself fetch the examples on the basis of the memory address and may display them.

Figure 4:
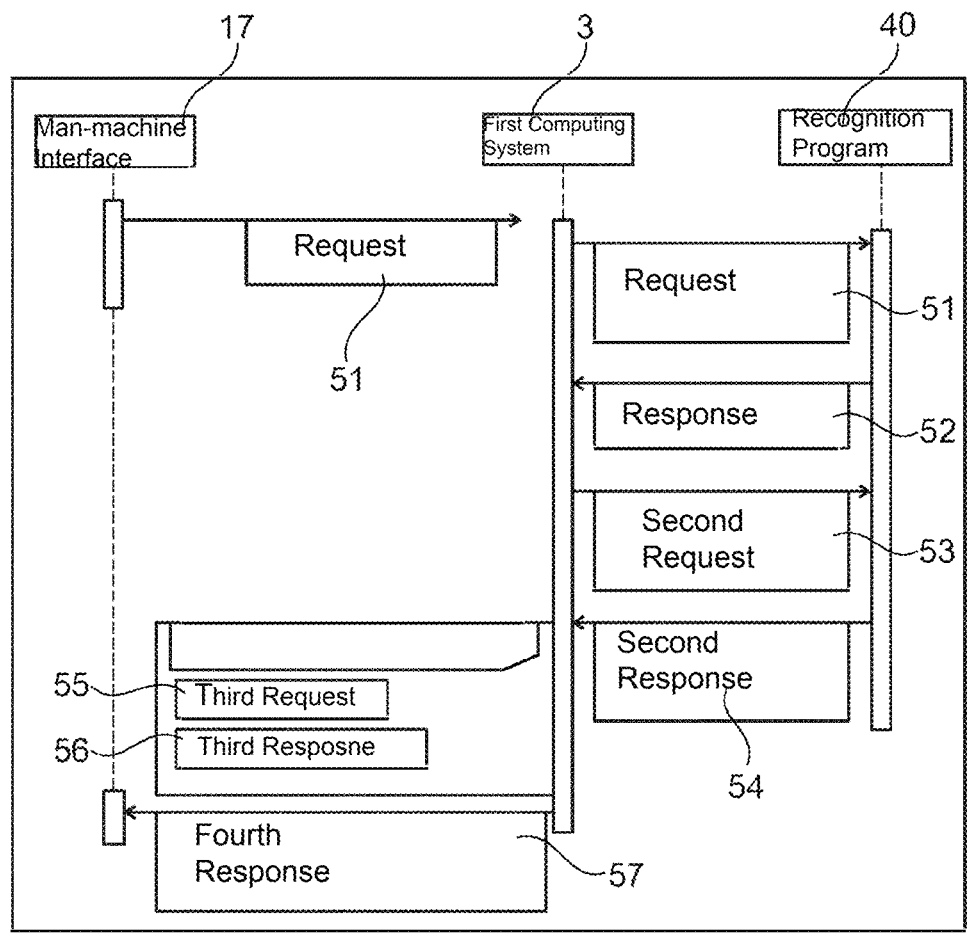
FIG. 4 shows a method sequence for processing a further request with the aid of the computing system.

FIG. 4 shows a schematic illustration of a program sequence for determining information relating to the installation 2 and/or the control of the installation 2 with the aid of a request via the man-machine interface 17. In this case, an operator inputs a request to the man-machine interface 17 via a microphone. The request is: Show me images of a rolling mill. The spoken request 51 is transferred from the man-machine interface 17 to the computing system 3 via the programming interface 41. The programming interface 41 forwards the request 51 to the recognition program 40. The recognition program has speech recognition and is, for example, in the form of artificial intelligence, in particular a trained neural network. For example, the artificial intelligence is implemented in the form of a Rasa NLU program.

Instead of the request in the form of a speech signal, the request may also be in the form of text and/or a graphic and/or an image.

As described above, the recognition program 40 determines, on the basis of the request, a function and, if possible, a content which is intended to be searched for using the function. The functions correspond to the application programs which are available to the computing systems, the man-machine interfaces and/or the sensor apparatuses or are available via a network connection. The functions may also represent only a part of an application program. In particular, an application program may have various functions. Different contents can be searched for using each function, for example.

The recognition program uses, for example, a first data model which is provided for a plurality of further computing systems and/or sensor apparatuses and/or man-machine interfaces and/or further application programs. The recognition program determines, on the basis of the request and with the aid of the first data model, the at least one further computing system and/or the at least one sensor apparatus and/or the at least one man-machine interface and/or the at least one application program which can provide the information sought with the request.

The first data model has, for the further computing systems and/or the sensor apparatuses and/or the man-machine interfaces and/or the further application program, stipulated examples, in particular example sentences, of requests which can be used to successfully search for information in the further computing systems and/or in the sensor apparatuses and/or in the man-machine interfaces and/or further application programs.

The first data model may be designed with the aid of artificial intelligence, in particular as a trained neural network. The artificial intelligence is designed to determine, on the basis of the request, the further computing system and/or the sensor apparatus and/or the man-machine interface and/or the application program which can provide the information sought with the request.

For example, the first data model may be in the form of a trained neural network which was trained for the application programs "Show an image of the installation" and/or for the application program "Search for a document of the installation" with the following example sentences.

For the application program "Show an image of the installation", the following example sentences were used to train the neural network:
Show me a photo of a rolling mill.
I would like to look at images of a hot strip mill.
Are there images of a blast furnace?
I am interested in a video of the finishing train.

For the application program "Search for a document of the installation", the following example sentences were used to train the neural network:
I need the mechanical drawing of the finishing stand.
Show me the data sheet of the motor.

As a response 52, the recognition program transmits an application program which can be used to process the request 51.

In this case, the fifth application program "Plant Visuals" is transferred to the third computing system 3 as a response 52.

The third computing system 3 then creates a second request 52 with the request "Show me an image of a rolling mill" using the fifth application program "Plant Visuals". The second request 52 is again transferred to the recognition program 40. The second request contains the same request "Show me an image of a rolling mill" as the first request and additionally the suggestion that the request is intended to be executed with the aid of the fifth application program "Plant Visuals".

The recognition program has second data models, wherein a second data model is respectively provided for a further computing system or a sensor apparatus or a man-machine interface or a further application program. A separate second data model may therefore be respectively provided for each further computing system and/or each sensor apparatus and/or each man-machine interface and/or each further application program.

The recognition program determines, on the basis of the second data model of the fifth application program "Plant Visuals" and the request "Show me an image of a rolling mill", which function of the fifth application program and which content can be used to determine the information sought.

The second data model is, for example, in the form of artificial intelligence, in particular a trained neural network, wherein the artificial intelligence is designed to determine the application program of the further computing system and/or of the sensor apparatus and/or of the man-machine interface and/or the function and, in particular, the content of the function of the application program which can provide the information sought. The second data model may be implemented with the aid of the Rasa NLU program. The second data model has, for the fifth application program, stipulated examples, in particular example sentences, of requests which can be used to successfully search for information in the further computing systems and/or in the sensor apparatuses and/or in the man-machine interfaces and/or further application programs with the aid of functions of the fifth application program and preferably contents of functions of the fifth application program.

The second data model may be designed with the aid of a trained neural network. The second data model for the application program "Show an image of the installation" may have been trained using the following example sentences for the function "Show an image" and the function "Show a video":

For the function (intent) "Show an image", the following example sentences are used to train the neural network:
Show me a photo of a [rolling mill] (asset)
I would like to look at images of a [hot strip mill] (asset)
Are there images of a [blast furnace] (asset)

The content (entity) of the function is indicated in the square brackets and the type of content (entity) is indicated in the parentheses. The contents can be distinguished or classified once again with the aid of the types.

For the function (intent) "Show a video", the following example sentences are used to train the neural network:
I am interested in a video of the [finishing mill] (asset)

The content (entity) of the function is indicated in the square brackets and the type of content is indicated in the parentheses.

The second data model can be designed with the aid of a trained neural network. The second data model for the application program "Search for a document of the installation" may have been trained using the following example sentences:

For the function (intent) "Show a document", the following example sentences are used to train the neural network:
I need the [mechanical drawing] (document type) of the [finishing stand] (asset)
Show me the [data sheet] (document type) of the [motor] (asset)

The content (entity) of the function is indicated in the square brackets and the type of content is indicated in the parentheses. In the example sentences mentioned, two contents of different types are indicated in each case.

In a similar manner, neural networks may also be trained for other application programs which control or monitor the installation, in particular.

The recognition program 40 determines, on the basis of the second request 52 and the second data model, "Search for an image" as the function and "rolling mill" as the content.

This information is returned to the assistant program 30 of the first computing system 3 as a second response 54. The assistant program of the computing system 3 creates, on the basis of the transmitted function "Search for an image" and the content "rolling mill", a third request 55 which is transmitted, with the aid of the message broker, to the fifth application program 35 with the function of searching for an image for a rolling mill.

After receiving the request for images of rolling mills, the fifth application program 35 searches in connected data memories. If images of rolling mills are found by the fifth application program 35, these images are sent back to the first computing system 3 by the fifth application program 35 as a third response 56. On the basis of the third response 56, the first computing system 3 creates a fourth response 57 which is transmitted to the man-machine interface 17. The third response 57 contains at least one image of a rolling mill. The man-machine interface 17 receives the third response 56 and displays the at least one transmitted image on a screen.

Depending on the selected embodiment, not only the man-machine interface 17 can transmit requests to the first computing system 3 according to FIGS. 2 and 3, but rather the second, third, fourth and/or fifth computing system(s) 4, 5, 6, 18 and/or the sensor apparatuses and/or application programs, for example, can also transmit requests to the first computing system 3. The first computing system 3 processes requests from the further computing systems 4, 5, 6, 18 in the same manner as requests from the man-machine interface and/or the application programs and accordingly returns responses to the requests. This makes it possible to easily interchange information between the computing systems, sensor apparatuses and application programs which are connected to the first computing system 3.

In addition, the described computer-implemented method can also be used to respond to a request, in particular to control the installation, with the aid of different application programs and/or computing systems and/or sensor apparatuses and/or man-machine interfaces.

For example, for requests which cause the installation to be controlled, models, in particular trained neural networks, can be analogously used to find the application programs which can execute the requests. After determining the application programs which can execute the requests, the control commands contained in the requests are transferred to the determined application programs in order to accordingly control the installation.

Here a few examples of requests which control the installation and in which a first and a second data model are used to determine the appropriate application programs which can execute the request. The first and/or the second data model is/are in the form of trained neural networks, for example.

One example of a controlling request is: Reduce the bending force in stand F3 of the installation by 100 kN.

The first data model is used to determine the function of control (in particular level 2 control) of the installation on the basis of the request. The application program which can execute the request is therefore the control program of the installation.

The second data model for the control program of the installation determines, on the basis of the request, the function "Reduce" (actuator of the installation) and the contents: bending force (=specific actuator), stand F3 (asset), 100 kN (value). Types of contents are indicated in the brackets.

The task of controlling the corresponding actuator in the stand F3 of the installation in such a manner that the bending force is reduced by 100 kN is therefore transferred to the control program.

A second example of a controlling request is: Mark the current product, in particular a strip, in the finishing train, in particular in a rolling mill, for a quality analysis.

The first data model identifies, on the basis of the request, "quality monitoring" as the function, which represents the relevant application program.

The second data model for the quality monitoring application program identifies, on the basis of the request, the function "check" with the content "current" (time: NOW) and the content "strip" (asset). Types of contents are indicated in the brackets. The quality monitoring application program will ask a further application program, for example an installation tracking program, to mark the current product. The marking is used to subsequently identify the current product on the basis of the marking and to then be able to analyze the marked product.

A third example of a controlling request is: Give me information relating to the current strip of the installation.

The first data model identifies, on the basis of the request, installation tracking as the function, which represents the relevant application program.

The second data model for the installation tracking application program identifies, on the basis of the request, "strip information" as the function with the content: current (time "NOW").

The information relating to the current strip can therefore be retrieved from a corresponding data memory with the aid of the installation tracking application program or can be determined on the basis of current sensor data from sensors of the installation.

For example, a requested application program or a requested computing system and/or a requested sensor apparatus and/or a requested man-machine interface can return, as a response to a request for an item of information, a further request for a further item of information relating to the installation to the first computing system 3 from which the request was transmitted. The first computing system then determines, on the basis of the further request, for example with the aid of the recognition program 40, which further computing system 4, 5, 6, 18 and/or which sensor apparatus 11, 12, 13 and/or which man-machine interface 17 can respond to the further request. The first computing system 3 then obtains the requested further information from the at least one determined further computing system 4, 5, 6, 18 and/or from the at least one determined sensor apparatus 11, 12, 13 and/or from the at least one determined man-machine interface 17 via the interface 24, 25. The first computing system 3 forwards the further information obtained to the requesting further computing system 4, 5, 6, 18 and/or to the requesting sensor apparatus 11, 12, 13 of the installation and/or to the requesting man-machine interface 17 via the interface 24, 25. The requesting further computing system 4, 5, 6, 18 and/or the requesting sensor apparatus 11, 12, 13 of the installation and/or the requesting man-machine interface 17 process(es) the further information, for example in order to determine the requested information, and then forward(s) the requested information to the first computing system. An item of requested information can therefore be created with the aid of a plurality of further computing systems 4, 5, 6, 18 and/or sensor apparatuses 11, 12, 13 of the installation and/or man-machine interfaces 17.

The example described in FIG. 4 shows a free-field search input, in the case of which a recognition program 40 is called in order to find out which application program (app) is possible for performing the request. The recognition program calls a first data model containing example sentences for at least some, in particular for all, available application programs.

The request is compared with stipulated examples, in particular example sentences of the first data model. The example, in particular the example sentence, of the first data model which, according to predefined rules, has the best match to the request is selected. The predefined rules may select the example, in particular the example sentence, which has the best match, in particular the highest number of matching words, to the request. The application program belonging to the selected example, in particular the example sentence, is reported back to the first computing system 3. Depending on the selected embodiment, more than one application program with an indication of the quality of the match may also be transmitted to the first computing system.

The examples, in particular the example sentences, for the individual application programs may have been determined with the aid of artificial intelligence, in particular with the aid of a trained neural network. In addition, the comparison of the request with the example sentences of the first data model and the determination of the example(s), in particular example sentences, best matching the request can be determined with the aid of artificial intelligence, in particular with the aid of a trained neural network. The artificial intelligence may additionally determine a probability of the examples matching the request. The probabilities are transferred, with the selected examples, in particular the example sentences, and the associated application programs, to the first computing unit.

In addition, one or more of the further application programs which can be used to execute or respond to the request with the greatest probability can be determined for the request with the aid of a trained neural network. The artificial intelligence may additionally output a probability of how well suited to executing the request the application programs determined with the aid of the neural network are.

Only the application program with the highest probability is preferably used for the second step with the second data model. In addition, the application programs whose probabilities exceed a predefined value may also be used for the second step with the second data models.

The application programs determined with the aid of the first data model and preferably the probabilities which belong to the determined application programs and indicate how well the application program matches the search request, that is to say the request, are returned to the first computing system 3, in particular to the assistant program 30, as a list.

In the example described, the recognition program identifies that images were requested and that the Plant Visuals application program should therefore be used for the search. A specific example of an NLU program is the Rasa NLU program which is implemented using artificial intelligence, in particular using a trained neural network.

For each application program in the returned list, the recognition program is called again with the same request and with a second data model which is provided for the respective application program. The second data model has further stipulated examples, in particular example sentences, which are specifically stipulated for the corresponding application program. Each example, in particular each example sentence, of the second data model can be assigned to a particular function of the application program. An application program may also have only one function.

The second data model is, for example, in the form of artificial intelligence, in particular a trained neural network, wherein the artificial intelligence is designed to determine at least one function which can execute the request or can provide the information sought with the request. In addition, the neural network may output a probability for the determined function, which indicates how well suited to executing the request the function is. The second data model may be implemented with the aid of the Rasa NLU program, for example.

The examples, in particular the example sentences, for each second data model which is provided only for one application program may have been determined with the aid of artificial intelligence, in particular with the aid of a trained neural network. In addition, the comparison of the request with the stipulated examples, in particular with the example sentences, of the second data model and the determination of the example(s), in particular example sentences, best matching the request may have been determined with the aid of artificial intelligence, in particular with the aid of a trained neural network. The artificial intelligence additionally outputs a probability of the examples, in particular the example sentences, matching the request. The probabilities are transferred, with the application programs assigned to the selected examples, in particular the example sentences, to the first computing unit.

The recognition program may have a separate trained second data model, in particular a trained neural network, for each application program. The second data model may have example sentences with different grammars and words, for example for each function available in the application program. A mapping between the request and the respective function of the respective application program can therefore be created.

The recognition program returns the name of the function to be called in the application program or a list of functions with their probabilities and preferably additional information such as contents, parameters etc., which describe the execution of the function in a more precise manner, to the first computing unit. If this information is missing, a query, for example, may be sent to the man-machine interface and therefore to the operator in order to request the missing contents and parameters.

In the example in FIG. 4, the recognition program identifies, with the aid of the data model trained for Plant Visuals, that the function "Search for an image" is intended to be called. The additional information is a "rolling mill" here.

The assistant program 30 transmits a message, via the message broker, to the fifth application program Plant Visuals with the extracted information. The function "Search for an image" with the additional information "for a rolling mill" is called in the Plant Visuals application program. As the response, a list of images of a rolling mill is transmitted to the assistant program. The assistant program receives the response via the message broker, in this case a list of images of a rolling mill. The assistant program transmits the list of images of the rolling mill to the man-machine interface 17 in response to the request which has been made.

Alternatively, the search request may also be transmitted from an application program, in particular from an application program of a further computing system, to the assistant program. For example, the request may also be transmitted by another application program, via the message broker, directly to the assistant program without having to use a programming interface. In this case, three possibilities for the search request may arise. For example, it may be unknown which application program is intended to be queried if the search text is free text. In this case, the procedure is as described above and the application program is first of all determined with the aid of the first data model. Furthermore, it may already be known which application program is intended to be queried, but it is not known which function within the application program is intended to be called and which additional information is available. Accordingly, only the steps which have already been described above are carried out for the second data model of the known application program. Furthermore, it may already be known which application program is intended to be queried, which function is intended to be called and which additional information is intended to be taken into account. As part of such a search request, individual application programs can again also request additional information from other application programs, as already described above. Furthermore, however, it is ensured that the concatenation of the search requests is terminated.

Figure 5:
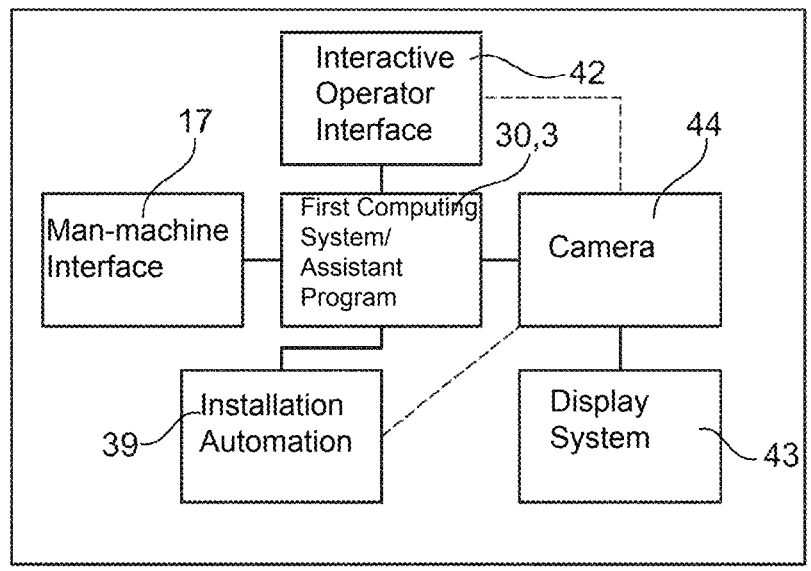
FIG. 5 shows a structural design of a further apparatus having a computing system and further computing systems for controlling and/or monitoring a technical installation.

FIG. 5 shows a schematic illustration of a structure for computing systems of an installation 2. In this case, the first computing system 3, in particular the assistant program 30 of the first computing system, is connected to an installation automation unit 39 which likewise has a computing system.

Furthermore, the first computing system 3, in particular the assistant program 30 of the first computing system, is connected to a man-machine interface 17. In addition, sensor apparatuses in the form of cameras 44 are connected both to the first computing system 3, in particular to the assistant program 30 of the first computing system, and to the installation automation unit 39, for example. Furthermore, a display system 43, for example in the form of monitors, is provided and is directly connected to the cameras 44. Furthermore, an application program in the form of interactive operator guidance 42 is provided and is connected to the first computing system 3, particular to the assistant program 30 of the first computing system. In addition, the interactive operator guidance 42 may also be directly connected to the camera 44.

The program structure in FIG. 5 has the advantage that the installation 2 can be controlled with less personnel and from a control room which does not allow a direct view of the installation. In this manner, a plurality of control platforms even of a plurality of installations may be combined in one control room. A plurality of installations can therefore be run at the same time from one control room. In addition, the control centers and the control rooms may also be arranged remotely from and independently of the location of the installation.

In order to make it possible to run the installation, that is to say for an operator to operate the installation, screens are provided in the form of man-machine interfaces 17 and allow a view of sections of interest of the installation via cameras 44. In addition, the man-machine interfaces 17 provide operating screens in order to have an overview of the installation automation. In addition, changes in the installation automation, that is to say the control of the installation, can be made via the operating screens of the man-machine interface. However, the problem of the number of required screens, which may be up to twelve monitors, exceeding the intelligence of the operator and the displays therefore having to be reduced may arise. Therefore, it is advantageous for the displays on the monitors to be situationally switched over to corresponding sections of the installation depending on the installation condition and operating state. The switchover can be carried out automatically according to the above-described methods with the aid of an application program of the man-machine interface. The installation condition and operating state can be effected using information from the installation automation, using evaluations of the camera images, for example using artificial intelligence, or further evaluations by means of an application program of the first computing system. The further evaluations can be connected, together with a knowledge-based, possibly co-learning, decision-making algorithm which changes over the monitors, to the assistant program 30 of the first computing system 3 in the interactive operator guidance application 42. The assistant program 30 represents a digital assistant for monitoring and/or controlling the installation.

The installation automation is designed to use the images from the camera system to automate the installation.

With the aid of the described methods, the installation automation can independently obtain and evaluate images of the installation and, depending on the evaluation, can change the control values for functions of the installation in order to achieve or maintain a desired method of operation. As a result of the direct connection, a low latency between the transmission of the images and the reaction of the installation automation is achieved. The display systems of the man-machine interface, which may comprise monitors, video walls etc., can also be directly connected to the assistant program 30, that is to say the core of the first computing system 3.

An operator may create and parameterize scenarios using the interactive operator guidance of the man-machine interface. In this case, it is possible to stipulate which images from which cameras are displayed on which monitors and for which events. In addition, it is possible to stipulate on the basis of which events a predefined scenario occurs. The scenario can be used to stipulate when which camera image is displayed on which monitor of the display system of the man-machine interface. Furthermore, it is possible to stipulate the control of the scenarios via a speech input at the man-machine interface. In this case, fixed commands can be stored in order to enable speech recognition. In addition, it is possible to stipulate the control of individual monitors using the digital assistant, that is to say the assistant program 30. In this case, fixed commands may be stored in order to specifically display individual monitors on a screen beyond defined scenarios. For example, the display monitors may be covered with stipulated information in the event of sudden faults. In this case, it is possible to stipulate that stipulated images from stipulated cameras or installation conditions are displayed on the monitors of the display system depending on the type of fault.

Figure 6:
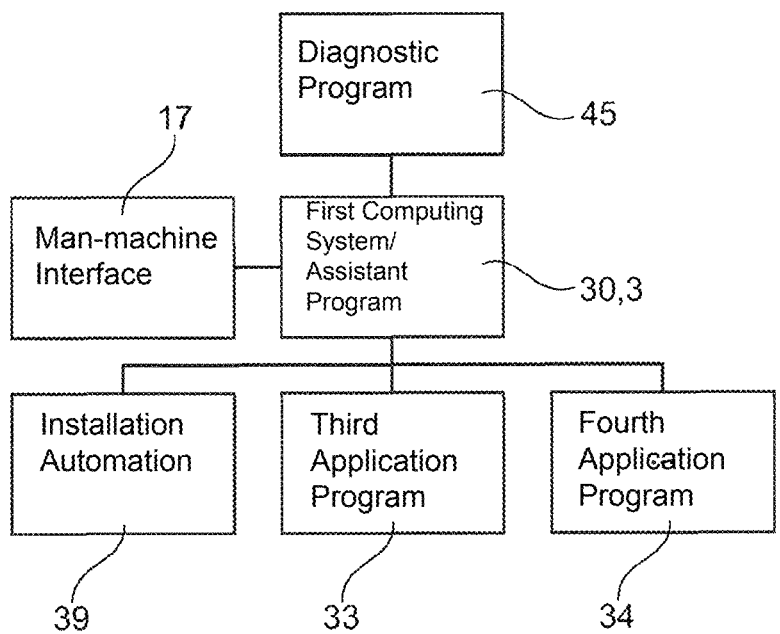
FIG. 6 shows a structural design of a further apparatus having a computing system and further computing systems for controlling and/or monitoring a technical installation.

FIG. 6 shows a further embodiment for a program structure of an installation 2. In this embodiment, the assistant program 30 of the first computing system 3 is connected to an installation automation unit 39, a condition monitoring program 33 and further application programs 34. In addition, a man-machine interface 17 is connected to the assistant program 30 of the first computing system 3. A diagnostic application program 45 is also connected to the assistant program 30 of the first computing system 3.

A condition of installations for producing and processing metal can be captured in a complex and difficult manner However, for many applications, it is expedient to obtain an image of the condition of the installation which is as closed as possible. For example, a fault analysis, a quality analysis, maintenance planning and/or a further development for achieving an installation improvement may be desired. Since the assistant program connects the various computing systems and sensor apparatuses of the installation sections of the installation to one another, an integral condition of the installation at/for a desired time/period can be aggregated. For example, the installation condition can be determined from a condition of the condition monitoring system, a condition of the installation automation, a condition of the production quality from a quality management system, a maintenance condition from a maintenance system and/or from a production plan of a production management system etc.

Furthermore, additional information can be automatically modeled from the above-mentioned and aggregated data with the aid of technological knowledge. Recommended actions such as control interventions in the control of the installation or other more complex conclusions can also be provided therefrom. A faster condition analysis is achieved with the proposed developments. There is a better insight into the functionality of the installation or production. Furthermore, this provides possibilities for carrying out the further control and analysis of the installation in a more precise manner As a result of the knowledge technologically modeled in the assistant program, a condition analysis which is independent of an operator can be constantly carried out. Comparisons of repeated condition analyses are therefore also more easily possible. Furthermore, the diagnostic program can already be used while starting up the installation in order to identify installation parts which have not yet been fully started up or to verify and document their correct start-up.

Figure 7:
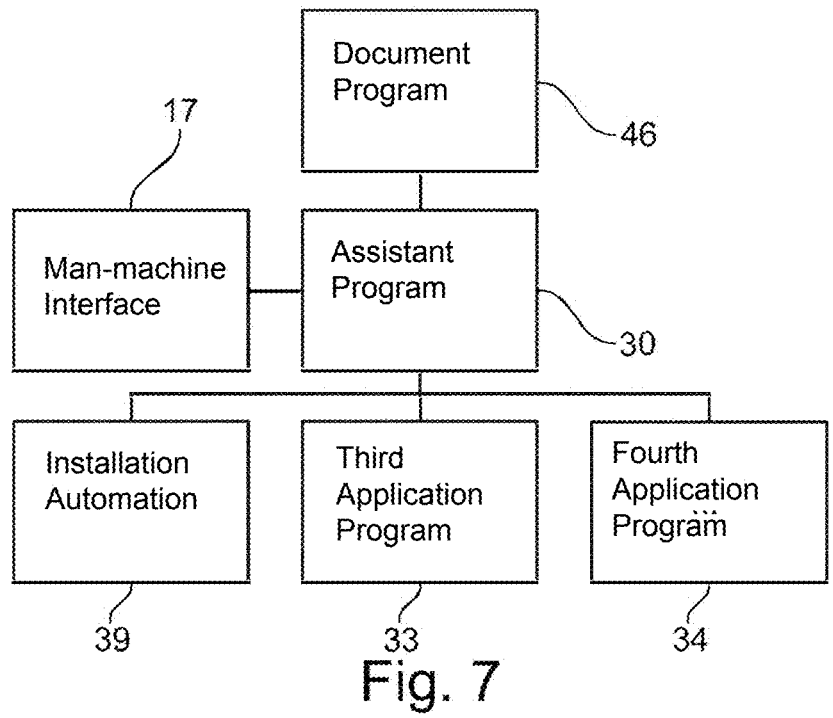
FIG. 7 shows a structural design of a further apparatus having a computing system and further computing systems for controlling and/or monitoring a technical installation.

FIG. 7 shows a further embodiment for a program structure of the installation 2 which is designed substantially according to FIG. 6. However, instead of or in addition to the diagnostic program 45, a document program 46 is connected to the assistant program 30 of the first computing system 3.

Installations for producing and/or processing metal usually consist of many different individual assemblies, partly also from different manufacturers. There is documentation for each of the respective individual assemblies which is stored in a data memory. Furthermore, it is useful to be able to access the documentation relating to the individual assemblies of the installation from various systems such as the installation automation, the condition monitoring, the maintenance system, the spare parts catalog etc., depending on the operating state. However, the documentation for the entire installation should advantageously be available only at one location, that is to say in a data memory, in order to avoid different versions or a large amount of maintenance effort. If the various systems such as installation automation, condition monitoring, maintenance system, spare parts catalog etc. are connected to the assistant program and document management with a search function is in turn connected to said systems, this function can be easily provided. In addition to automatic access by one of the systems mentioned above, access by an operator via the man-machine interface can also be effected. The system can therefore be expanded with targeted documentation. A search function for the documents can resort, in particular, to artificial intelligence which is provided by the first computing system 3.

Figure 8:
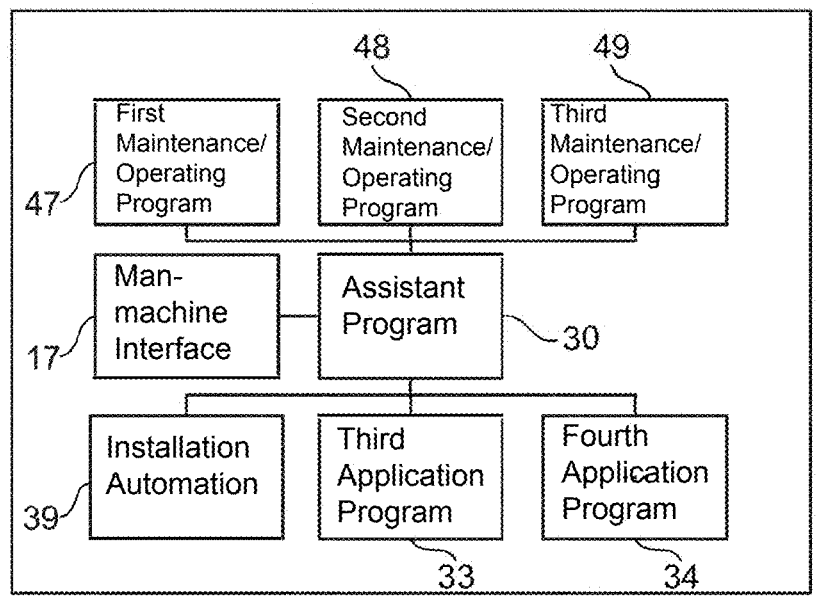
FIG. 8 shows a structural design of a further apparatus having a computing system and further computing systems for controlling and/or monitoring a technical installation.

FIG. 8 shows a further program structure for the installation 3 which corresponds substantially to the embodiment in FIG. 6, but not only one application program but rather a plurality of application programs are connected to the assistant program 30 of the first computing system 3. In this case, a first maintenance/operating assistant 47, a second maintenance/operating assistant 48 and a third maintenance/operating assistant 49 are connected to the assistant program 30 of the first computing system 3.

Maintenance and operating assistants which can provide an operator with information or instructions via the man-machine interface and can document steps which have been carried out can be connected to the assistant program. Furthermore, the maintenance/operating assistant programs may also intervene directly in the operation of the installation. The maintenance/operating programs may be based on stored knowledge or may take into account stored information and rules as well as independently learned knowledge, for example by means of artificial intelligence. In this case, evaluations can also be carried out with the aid of data analysis methods (deep learning, machine learning, support vector machines etc.). In addition, a special maintenance/operating assistant program can be used for each application.

The assistant program used provides the advantage that it is easily possible to incorporate further application programs. The installation can therefore be expanded with further individual assemblies or individual assemblies can be removed from the installation and the corresponding associated documentation or programs can be flexibly changed irrespective of the functionality of the respective individual assembly or irrespective of the functionality of the respective application program.

The proposed system having a modular structure comprising an assistant program and installation sections, so-called application programs, which can run internally in the first computing system or externally on other computing systems, provides improved flexibility. Communication between installation sections and the assistant program is preferably carried out using standardized messages and standardized communication protocols. For this purpose, it is possible to use, for example, a message broker which is used to ensure secure message transmission. This includes the buffering of messages and the fact that the messages are stored in a series, with the result that it is checked whether messages have actually been delivered.

Furthermore, it may be advantageous for a connection setup to be automatically restored after a connection failure. A basic setup can be carried out according to an Apache Artemis program. Defined and free search queries for information and/or knowledge can be carried out with the aid of the proposed system without specifically knowing which other installation section can and will provide which information in what manner The free search request (for example speech, text, image or video input) can be converted into a defined search query with the aid of an NLU (Natural Language Unit) program. In this case, the NLU may use artificial intelligence to incrementally improve the conversion. NLUs which already partially make it possible to use different languages are available in the prior art.

The described system can be implemented in a distributed computer network, possibly also via the Internet. Information, knowledge and their link may be stored in the application programs.

With the aid of the described system, the installation sections can communicate in order to interchange information and/or knowledge. In this case, both defined and free search queries for information and/or knowledge can be carried out without specifically knowing which other installation section can and will provide which information in what manner Different languages which can also be extended are available to the operator for the free search request. Information and knowledge can therefore be extracted from different languages.

Furthermore, the modular structure of the system makes it possible for the assistant program to function even if it is unclear a priori which installation section of the installation is available at a point in time. Installation sections can be explicitly replaced, expanded, modified, added or removed. In particular, the performance spectrum of the installation sections and therefore the information provided may change. This makes it possible for the general method of operation of other installation sections to not be adversely affected by a changed performance spectrum of one of the installation sections without adaptations in communication and function. However, the range of functions of other installation sections can be expanded or reduced in this case by changing the information relating to an installation section. Furthermore, knowledge which can be expanded by the operator in the individual application programs can be modeled and made available in installation sections. Furthermore, the knowledge can be applied to the information in order to generate added value for using the digital assistant. In addition, communication between installation sections and between installation sections and operators is modeled with the aid of freely formulated requests for information during communication (see incorporation of the NLU in the assistant program), which enables simple operation without interface know-how.

List of Reference Signs

1 Apparatus
2 Installation

3 First computing system
4 Second computing system
5 Third computing system
6 Fourth computing system
7 First data memory
8 Second data memory
9 Third data memory
10 Fourth data memory
11 First sensor apparatus
12 Second sensor apparatus
13 Third sensor apparatus
14 First actuator
15 Second actuator
16 Third actuator
17 Man-machine interface
18 Fifth computing system
21 First installation section
22 Second installation section
23 Third installation section
24 First interface
25 Second interface
26 Operator
30 Assistant program
31 First application program
32 Second application program
33 Third application program
34 Fourth application program
35 Fifth application program
36 Sixth application program
37 Seventh application program
38 Eighth application program
39 Installation automation
40 Recognition program
41 Further interface
42 Interactive operator interface
43 Display system
44 Camera
45 Diagnostic program
46 Document program
47 First maintenance/operating program
48 Second maintenance/operating program
49 Third maintenance/operating program
50 Input field
51 Request
52 Response
53 Second request
54 Second response
55 Third request
56 Third response
57 Fourth response
58 Display window

The invention claimed is:

1. An apparatus for controlling and monitoring a technical installation for at least one of producing and processing metal, comprising:
a computing system with at least one interface for connection to at least one system element, the at least one system element comprising at least one of:
at least one further computing system of the installation;
at least one sensor apparatus of the installation;
at least one man-machine interface; and
an application program;
wherein the computing system is configured to receive a request for an item of information relating to the installation from at least one requesting system element via the interface, the at least one requesting system element comprising at least one of:
at least one requesting further computing system;
a requesting sensor apparatus of the installation;
a requesting man-machine interface; and
an application program;
wherein the computing system can access a data model via the at least one system element;
wherein the data model provides an indication of what information can be accessed by the at least one system element;
wherein the computing system is configured to determine, on the basis of the data model, the at least one system element which can provide the information sought;
wherein the computing system is configured to obtain the requested information from the determined at least one system element via the interface;
wherein the computing system is configured to output the obtained information to the at least one requesting system element via the interface; and
wherein the computing system is configured to determine, on the basis of the data model, the probability of the at least one system element being able to provide the information sought.

2. The apparatus as claimed in claim 1, wherein the computing system is configured to determine an item of information sought by the request from an available request using a Natural Language Unit program.

3. The apparatus as claimed in claim 1, wherein:
the data model has, for the at least one system element, stipulated examples of search requests which can be used to search for information in the at least one system element; and
the computing system is configured to determine, by comparing the stipulated examples with the request, which of the at least one system element can provide the information sought.

4. The apparatus as claimed in claim 3, wherein the computing system is configured to determine, by comparing the stipulated examples with the information sought with the request, which of the at least one system element can provide the information sought.

5. The apparatus as claimed in claim 1, wherein:
the computing system is configured to receive, in response to a request for an item of information, a further request for a further item of information relating to the installation from the determined at least one system element;
the computing system is configured to determine, on the basis of the further request with the aid of the data model, which of the at least one system element can respond to the further request;
the computing system is configured to obtain the requested further information from the determined at least one system element via the interface; and
the computing system is configured to output the further information obtained to the at least one requesting system element via the interface.

6. The apparatus as claimed in claim 1, wherein:
the computing system is configured to obtain an item of stipulated information from the and/or a man machine interface and/or the further application program via the interface depending on at least one of at least one predefined operating state of the installation and/or and a predefined control value for the installation; and the computing system is configured to output the independently obtained information to the at least one system element via the interface.

7. The apparatus as claimed in claim 1, wherein:
further computing systems for installation sections of the installation can be connected via the interface;
the further computing systems perform at least one of installation control, condition monitoring, a maintenance system for at least one installation section of the installation, and have a spare parts catalog for at least one installation section of the installation;
each installation section has a data memory containing documentation relating to the installation section;
the computing system is configured to:
  access the documentation relating to the installation sections of the installation via the interface,
search for information in the documentation, and
  output it via the interface to the at least one system element;
the computing system is configured to determine at least one item of information relating to:
  the installation with the aid of a maintenance/operating program,
  output instructions via the interface,
  document steps which have been performed, and
  intervene in control of the installation;
the maintenance/operating program takes into account at least one of stored knowledge and learned knowledge; and
the maintenance/operating program carries out evaluations using data analysis methods.

8. The apparatus as claimed in claim 7, wherein the learned knowledge is learned with artificial intelligence.

9. The apparatus as claimed in claim 1, wherein:
the data model has a first data model which is provided for the at least one system element, the at least one system element being a plurality of system elements;
the computing unit is configured to determine, on the basis of the request and with the aid of the first data model, one of the plurality of system elements which can provide the information sought with the request;
the data model has at least one second data model for at least one more of the plurality of system elements;
the computing unit is configured to determine, on the basis of the second data model, whether the information sought with the request can be determined from at least one of:
  which application program of the at least one more of the plurality of system elements; and
  which function of a determined further application program; and
the computing unit is configured, after determining whether the information sought with the request can be determined, to transfer the request to the determined function or the determined application program and to then receive the information from the determined function or from the determined application program.

10. The apparatus as claimed in claim 1, wherein:
at least one of the data model, the first data model, and the second data model are configured with the aid of artificial intelligence; and
the artificial intelligence is configured to determine the at least one system element which can provide the information sought with the request.

11. The apparatus as claimed in claim 1, wherein:
the computing system has an assistant program;
the at least one system element has at least one application program;
the assistant program is configured to receive a request for an item of information via the interface;
the assistant program is configured, on the basis of the information sought by the request, to take the data model as a basis for searching for at least one application program which can provide the information sought;
the assistant program is configured to forward the request to the application program which can provide the information;
the assistant program to receive the information sought from the application programs; and
the assistant program is configured to output the information received from the application programs to a requesting one of the at least one system element via the interface.

12. A method for controlling and monitoring a technical installation for at least one of producing and processing metal, comprising:
using an assistant program with at least one interface for connection to application programs;
wherein the assistant program receives a request for an item of information relating to the installation from at least one requesting application program via the interface;
wherein the assistant program can access a data model;
wherein the data model provides an indication of which information can be provided by at least one further application program;
wherein the assistant program determines, on the basis of the request and on the basis of the data model, which application program can provide the requested information;
wherein the assistant program transmits the request to the at least one determined application program which can provide the requested information;
wherein the assistant program receives a response from the determined application program;
wherein the assistant program outputs the received response to the requesting application program; and
wherein the assistant program determines, on the basis of the request and on the basis of the data model, a probability that at least one of the application programs is correctly assigned to the request.

13. The method as claimed in claim 12, wherein:
the data model has stipulated examples of requests which can be used to find stipulated information in the further application programs; and
it is determined which at least one further application program can provide the information sought by comparing the stipulated examples with at least one of the request and the information sought in the request.

14. The method as claimed in claim 12, wherein:
the data model has a first data model which is provided for a plurality of further application programs;
the assistant program first of all determines, on the basis of the request and with the aid of the first data model, the further application program(s) which can provide the information sought with the request;
the data model has second data models for the respective further application programs;
the assistant program determines, on the basis of the at least one second data model of the at least one further application program determined in the first step, a function of the determined further application program which can provide the information sought;

the assistant program then transfers the request to the determined function of the determined further application program; and the assistant program then receives the information from the determined function of the determined further application program.

15. The method as claimed in claim 12, wherein:

at least one of the data model, the first data model, and the second data model are in the form of artificial intelligence; and the artificial intelligence is configured to determine at least one of the further application program(s) and the function of the further application programs which can provide the information sought.

16. The method as claimed in claim 12, wherein:

the assistant program receives, in response to a request for an item of information, a further request for a further item of information relating to the installation from the requested application program;

the assistant program determines, on the basis of the further request with the aid of the data model, which application program can respond to the further request;

the assistant program obtains the further information from the at least one determined application program; and the assistant program outputs the further information obtained to the requesting application program.

17. The method as claimed in claim 12, wherein:

the assistant program determines different probabilities for a plurality of further application programs for a request; and the application programs with higher probability are executed first in order to obtain the information.

18. A system for controlling and monitoring an installation for producing and processing metal, comprising:

a computing system having at least one interface configured to connect to at least a first device, a second device, and a third device, the computing system configured to receive a request for an item of information relating to the installation from the first device via the at least one interface; and a data model accessible by the computing system, the data model configured to provide an indication which of the second device and the third device can provide the information;

wherein the system uses an assistant program with at least one interface for connection to application programs;

wherein the assistant program receives a request for an item of information relating to the installation from at least one requesting application program via the interface;

wherein the assistant program can access a data model;

wherein the data model provides an indication of which information can be provided by at least one further application program;

wherein the assistant program determines, on the basis of the request and on the basis of the data model, which application program can provide the requested information;

wherein the assistant program transmits the request to the at least one determined application program which can provide the requested information;

wherein the assistant program receives a response from the determined application program;

wherein the assistant program outputs the received response to the requesting application program;

wherein the assistant program determines, on the basis of the request and on the basis of the data model, a probability that at least one of the application programs is correctly assigned to the request;

wherein the computing system is configured to obtain, via the interface, the information from the determined one of the second device and the third device; and wherein the computing system is configured to output the information to the first device.

19. The system as claimed in claim 18, wherein each of the first device, the second device, and the third device are at least one of:

a further computing system of the installation;

at least one sensor apparatus of the installation;

at least one man-machine interface; and an application program.

* * * * *